(12) United States Patent
Da Silva et al.

(10) Patent No.: US 12,242,153 B2
(45) Date of Patent: Mar. 4, 2025

(54) DIGITAL DISPLAY SCREEN AND VEHICLE COMPONENT COMPRISING SUCH A DIGITAL DISPLAY SCREEN

(71) Applicant: Faurecia Clarion Electronics Europe, Paris (FR)

(72) Inventors: Edouard Da Silva, Herblay (FR); Romain Feilleux, Epinay sur Seine (FR); James Gourlay, Dumbarton (GB); Derek Peden, Livingston (GB)

(73) Assignee: Faurecia Clarion Electronics Europe, Paris (FR)

( * ) Notice: Subject to any disclaimer, the term of this patent is extended or adjusted under 35 U.S.C. 154(b) by 0 days.

(21) Appl. No.: 18/516,944

(22) Filed: Nov. 21, 2023

(65) Prior Publication Data

US 2024/0176184 A1 May 30, 2024

(30) Foreign Application Priority Data

Nov. 29, 2022 (EP) ..................................... 22306755

(51) Int. Cl.
*G02F 1/00* (2006.01)
*G02F 1/13357* (2006.01)

(52) U.S. Cl.
CPC .............. *G02F 1/133603* (2013.01)

(58) Field of Classification Search
None
See application file for complete search history.

(56) References Cited

U.S. PATENT DOCUMENTS

| 2009/0180078 | A1* | 7/2009 | Whitehead | G03B 21/14 353/30 |
| 2010/0061087 | A1* | 3/2010 | Stevens | G02F 1/133605 362/97.3 |
| 2020/0285117 | A1* | 9/2020 | Hashimoto | G02F 1/133603 |
| 2021/0103187 | A1* | 4/2021 | Woodgate | H01L 33/58 |
| 2021/0165281 | A1* | 6/2021 | Hashimoto | B60K 35/21 |
| 2022/0075111 | A1* | 3/2022 | Yamashita | G02B 6/009 |

OTHER PUBLICATIONS

European Search Report corresponding to application 22306755.4, dated May 2, 2023, 7 pages.

* cited by examiner

*Primary Examiner* — Gerald J Sufleta, II
(74) *Attorney, Agent, or Firm* — Reising Ethington P.C.

(57) ABSTRACT

A digital display screen having an image displaying element and a backlighting device configured to backlight the image displaying element. The backlighting device defines a plurality of lighting zones, each lighting zone comprising one light source controllable to adjust the lighting intensity generated by the lighting zone. The lighting zones include at least one first lighting zone defining a first lighting surface having a first area and at least one second lighting zone defining a second lighting surface having a second area, the second area being strictly smaller than the first area.

11 Claims, 2 Drawing Sheets

DIGITAL DISPLAY SCREEN AND VEHICLE COMPONENT COMPRISING SUCH A DIGITAL DISPLAY SCREEN

TECHNICAL FIELD

The present invention relates to the technical field of digital display screens, in particular to a digital display screen comprising an image display panel, such as a liquid crystal display (or LCD), configured to generate an image, and a backlighting unit configured for backlighting the image display panel.

BACKGROUND

A digital display screen can be used in a vehicle to display different types of images to the user.

A display screen has for example a large surface divided in different regions displaying different types of images, including e.g. a first region intended to display images containing critical information such as the speed of the vehicle, a second region intended to display images containing navigation information and/or a third region intended to display images with a decorative purpose.

A display screen with a large surface is expensive, notably due to the large number of light emitting diodes that are necessary for backlighting the image display element.

Local dimming technology is deployed into LCDs to improve the image contrast and reduce the system power consumption. For 2D local dimming, a regular array of a light emitting diodes (LEDs) is deployed behind the Liquid Crystal (LC) glass panel. The video content delivered to the LC is processed and a 2D intensity distribution, based on the video content, is delivered to the LED array. So for example, if the moon in the night sky was the video content, only LEDs in the vicinity of the image of the moon would be illuminated to backlight the corresponding LC pixels. Therefore, the black for the night sky would appears blacker than if a standard, continuous illuminated rectangular backlight was used behind the LC. This would also result in less electrical power being required to the backlight, as some of the LEDs would not be powered.

In local dimming, the zone size, e.g. corresponding to the distance between LED light sources in the array, influences the performance and cost of the system. A small zone size corresponding to a large number of LEDs across the backlight results in a good image performance because the pattern of dimmed LEDS more closely matches the image shuttered in the LC. However, a large number of LEDs comes at a higher cost than standard backlight solutions. Conversely, the larger the zone size, then the smaller the number of independently dimmable LEDs which reduces the system cost. However, a large zone size reduces the performance, and for instance the Halo effect becomes more evident.

SUMMARY

One of the aims of the invention is to propose a digital display screen that has satisfactory performances whilst being economical to produce.

To this end, the invention proposes a digital display screen comprising an image displaying element, and a backlighting device configured to backlight said image displaying element, the backlighting device defining a plurality of lighting zones, each lighting zone comprising one light source controllable to adjust the lighting intensity generated by the lighting zone, the lighting zones comprising at least one first lighting zone defining a first lighting surface having a first area and at least one second lighting zone defining a second lighting surface having a second area, the second area being strictly smaller than the first area.

The plurality of lighting zones of different areas allows to match the resolution and contrast requirements of the different displaying regions of the display screen, while reducing the total number of light sources required, which allows to reduce the cost and also to enhance the reliability of the display screen.

In particular, for many display applications, different types of image content have fixed regions across the display, and that a local dimming backlight can be produced that has differing zone sizes, mapped to the type of image content in its vicinity. Therefore, large zone size (and therefore, low cost) can be deployed where small zone size (and therefore higher cost) is not needed. This is particularly true in automotive displays, which typically have fixed image content depending on the User Interface (UI) design. In LED backlights with arrays of LEDs, the larger the zone size (or pitch between the LEDs) then the thicker the required system thickness is, because a larger Optical Distance (OD) is required between the LED top surface and the LC diffuser stack to achieve homogeneity prevent the occurrence of spots of light where each LED is located and generate a uniform rectangle of light from the LED array instead.

In specific embodiments, the digital display screen comprises one or more of the following features, taken individually or in any technically feasible combination:
- the backlighting device comprises zone barriers separating the lighting zones, at least one lighting zone being delimited by zones barriers located at the periphery of the lighting zones, each of the zone barriers being configured for blocking at least part of the light hitting the zone barrier,
- each of the zone barriers has a cross-section of substantially triangular shape or parabolic shape,
- each of the zone barriers modifies the Point Spread Function of one spot of light delivered by one of the light sources to have a Full Width Half Maximum in the range from 0.5 pixels wide to 5 pixels wide,
- the zones barriers are divided into a first group and a second group, the zone barriers of the first group extending perpendicular to the zone barriers of the second group, so as to create an array of rectangular lighting zones,
- the backlighting device comprises a support supporting the light sources,
- the support comprises a light-guiding layer, the light sources being covered and/or embedded in the light-guiding layer,
- the zone barriers are covered and/or embedded in the light-guiding layer,
- each of the zone barriers extends over the entire thickness of the light-guiding layer,
- each of the first lighting zones comprises at least one first light emitting diode defining the light source and each of the second lighting zones comprises at least one second light emitting diode defining the light source,
- each of the first light emitting diode has a first light emitting surface, wherein the first light emitting surface of each first light emitting diode has a first area and each of the second light emitting diode has a second light emitting surface, wherein the second light emitting surface of each second light emitting diode has a second area, the second area being strictly smaller than the first area, each of the first lighting zones comprises a unique first light emitting diode and/or each of the second lighting zones comprises a unique second light emitting diode.

The invention further relates to a vehicle component comprising at least one digital display screen as described above.

BRIEF DESCRIPTION OF THE DRAWINGS

The invention and its advantages will be better understood upon reading the following description given solely by way of non-limiting examples and made with reference to the appended drawings in which.

DETAILED DESCRIPTION

Figure 1:
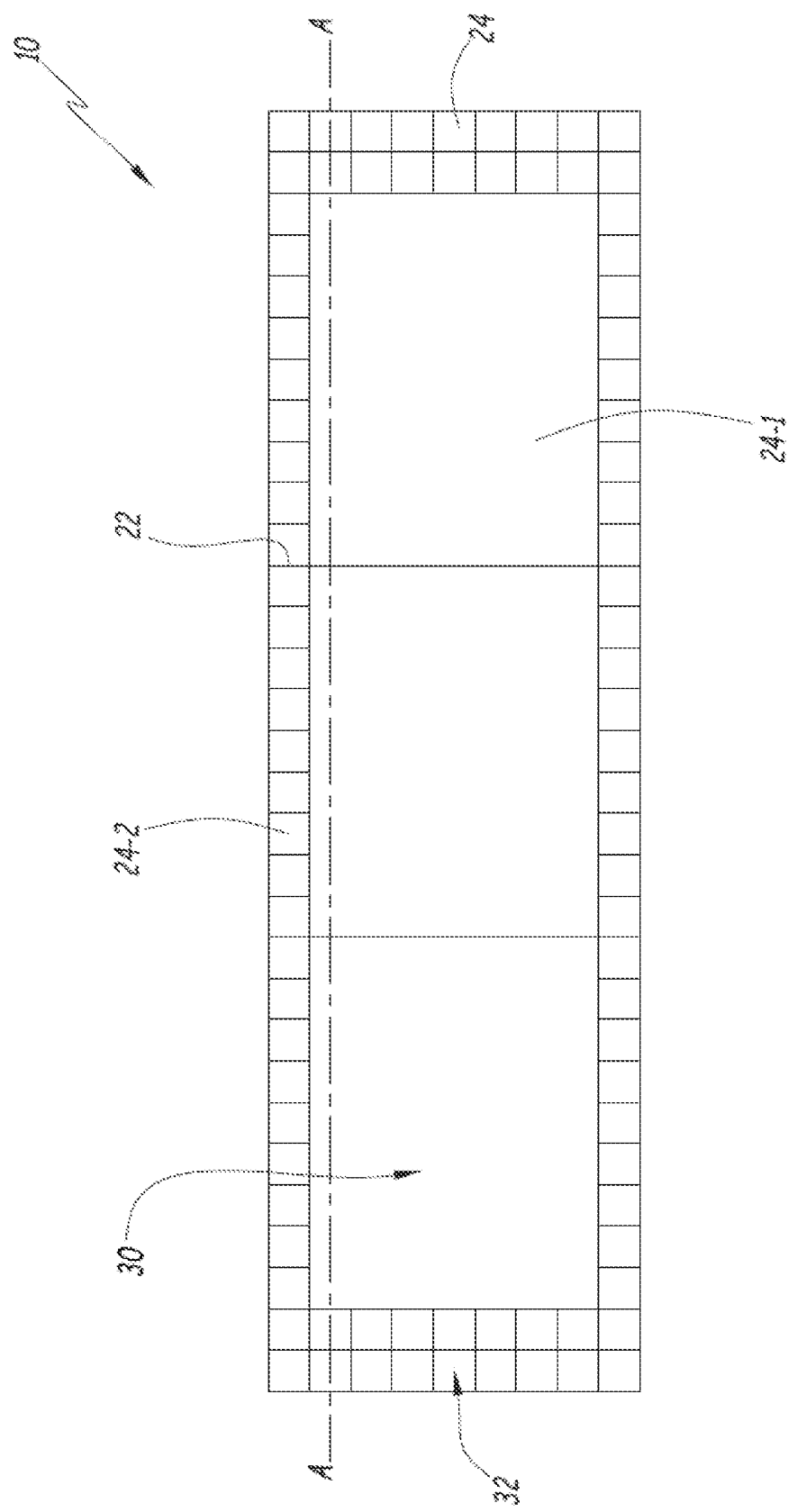
FIG. 1 is a top view of a digital display screen.
Figure 2:
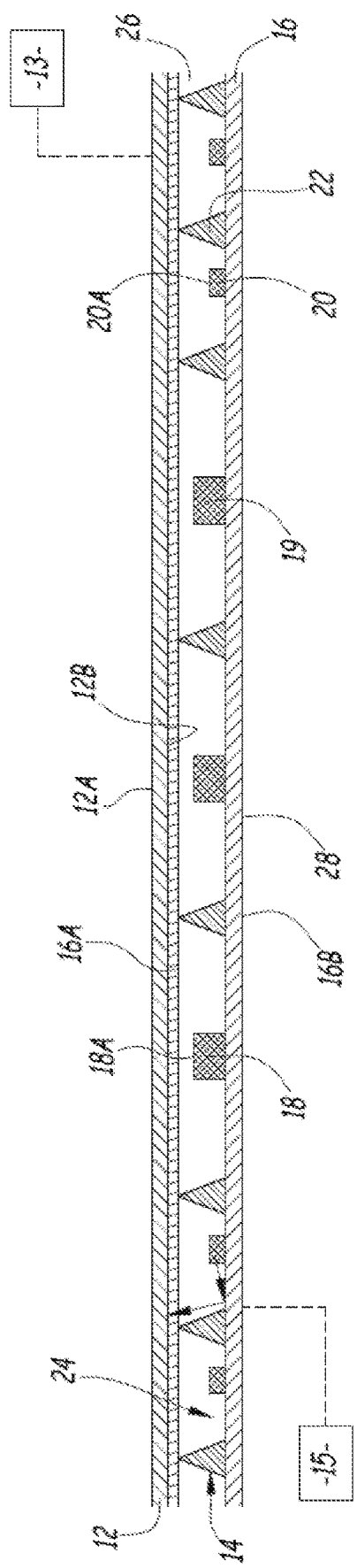
FIG. 2 is a cross-sectional view of the digital display screen of FIG. 1 taken along A-A on FIG. 1.

As illustrated on FIGS. 1 and 2, a digital display screen 10 comprises an image-displaying element 12 and a backlighting device 14.

The digital display screen 10 is preferably integrated in a component, in particular a component of a vehicle, for example an automotive vehicle. The component is for example a vehicle interior trim, e.g. a dashboard, a door panel or a ceiling.

The image-displaying element 12 is preferably an optical device configured to generate image to be displayed to the user.

Preferably, the image-displaying element 12 is a liquid-crystal display (LCD), in particular a thin-film-transistor liquid-crystal display (TFT).

The image-displaying element 12 has a front surface 12A and a rear surface 12B. The front surface 12A is intended to be visible by the user.

The image-displaying element 12 is for example plate shaped, the front surface 12A and the rear surface 12B being the two opposed faces of the image-displaying element 12.

The image-displaying element 12 is for example divided into at least one first region 30 and at least one second region 32.

The first region 30 is for example a low definition display region and the second region 32 is for example a high definition display region The first region 30 is for example intended to display non-critical information to the user, e.g. navigation information or for decorative purposes. The second region 32 is for example intended to display critical information to the user, e.g. the speed of the vehicle.

Preferably, the digital display screen 10 comprises a display control unit 13 to control the generation of the image displayed by the image-displaying element 12, and in particular in the first region 30 and in the second region 32.

The backlighting device 14 is configured to backlight said image-displaying element 12. The backlighting device 14 is arranged to backlight the rear surface 12B of the image-displaying element 12 such that the image is visible on the front surface 12A of the image-displaying element 12.

Preferably, the digital display screen 10 comprises a lighting control unit 15 to control the lighting generated the backlighting device 14, and in particular the lighting intensity.

The backlighting device 14 comprises a plurality of lighting zones 24, and preferably an array of rectangular lighting zones 24 as shown in FIG. 1.

Each lighting zone 24 comprises one light source for generating backlighting light in this lighting zone 24.

The lighting zones 24 comprises at least one first lighting zone 24-1 having a first area A1 and at least one second lighting zone 24-2 having a second area A2, the second area A2 having a lighting surface strictly smaller than that of the first area A1.

The first area A1 of each of the first lighting zone 24-1 is for example comprised between 20 $mm^2$ and 30 $mm^2$. The second area A2 of each of the second lighting zone 24-2 is for example comprised between 5 $mm^2$ and 15 $mm^2$.

The first lighting zones 24-1 are preferably intended to backlight the first region 30 of the image-displaying element 12 (low definition display region) and the second lighting zones 24-2 are preferably intended to backlight the second region 32 of the image-displaying element 12 (high definition display region).

The light source of each lighting zone 24 are controllable to adjust the lighting intensity generated by said lighting zone 24.

In particular, the lighting control unit 15 is able to control individually the light source of each lighting zone 24 and to adjust the lighting intensity generated by each of the lighting zones 24 according to the image displayed on the corresponding region of the image-displaying element 12.

Since each of the second lighting zones 24-2 has a small area A2, the lighting control unit 15 can control the backlighting intensity on small lighting surfaces, which allows for high resolution and contrast content on the second region 32 of the image-displaying element 12.

The light source of the lighting zones 24 comprises one or a plurality of lighting element, such as a LED or a bunch of micro-LEDs.

The lighting intensity of each lighting element of one light source is for example controllable individually by the lighting control unit 15. Alternatively, the lighting intensity of the lighting elements of one light source are controllable conjointly by the lighting control unit 15. In a preferred embodiment, each of the first lighting zones 24-1 comprises at least one first light emitting diode 18 and each of the second lighting zones 24-2 comprises at least one second light emitting diode 20.

The first light emitting diodes 18 and the second light emitted diodes 20 are configured for emitting light.

Preferably, each of the first lighting zones 24-1 comprises a unique first light emitting diode 18 and/or each of the second lighting zones 24-2 comprises a unique second light emitting diode 20. This allows reducing the number of components and thus enhancing the reliability of the digital display screen 10.

The first light emitting diodes 18 and the second light emitted diodes 20 each comprise a light emitting surface 18A, 20A.

The light emitting surface 18A, 20A of each one of the first light emitting diodes 18 and the second light emitting diodes 20 is the surface of that first light emitting diode 18 or second light emitting diode 20 that emits light upon operation of the light emitting diodes 18, 20.

The light emitting surface 18A of each first light emitting diode 18 has a third area A3 and the light emitting surface 20A of each second light emitting diode 20 has a fourth area A4, the fourth area A4 being strictly lower than the third area A3.

In other words, the second light emitting diodes 20 are of "smaller size" than the first light emitting diodes 18.

In one example, the third area A3 and the fourth area A4 are comprised between 0.5 mm$^2$ and 5 mm$^2$.

In an advantageous embodiment, the backlighting device 14 comprises zone barriers 22 delimiting the lighting zones 24.

At least one lighting zone 24 is delimited by zone barriers 22 located at the periphery of the lighting zone 24.

Preferably, each lighting zone 24 is delimited by zone barriers 22. Adjacent lighting zone 24 are separated by barriers 22.

The zones barriers 22 include for example a first group and a second group, the zone barriers 22 of the first group extending perpendicular to the zone barriers 22 of the second group, so as to create an array of rectangular lighting zones 24 as illustrated on FIG. 1.

Preferably, each of the zone barriers 22 is configured for blocking at least part of the light hitting said zone barrier 22, in order to allow only a controlled amount of light to be transmitted between two neighboring lighting zones 24 separated by the zone barrier 22.

In one example, each zone barrier 22 has a reflectance from the light hitting said zone barrier 22 at least equal to 80%.

In one example, each zone barrier 22 has a cross-section of substantially triangular shape or parabolic shape.

In other word, the width of the cross-section of each zone barrier 22 becomes gradually narrower near the image-displaying element 12.

In a particular embodiment, the cross-section of each zone barrier 22 is defined according to a curve parameterized to control the point-spread function (PSF).

Each of the zone barriers 22 preferably modifies the PSF of a spot of light delivered by one of the light sources 18, 20 to have a Full Width Half Maximum (FWHM) in the range from 0.5 pixels wide to 5 pixels wide.

The Point Spread Function (PSF) is a mathematical function describing the response of the display screen 10 to a spot light delivered by a light source 18, 20 and in particular the blurring of the spot of light delivered by one of the light source 18, 20. The Point Spread Function (PSF) is e.g. represented by a Gaussian function.

The Full Width Half Maximum (FWHM) represents the distance between two points on a curve at which the function reaches half its maximum value.

In particular, the distance between the two points of the PSF at which the PSF reaches half its maximum value is comprised between 0.5 pixels wide to 5 pixels.

In a particular embodiment, the backlighting device 14 comprises a support 16 supporting the light sources, e.g. first light emitting diodes 18 and second light emitting diodes 20, and preferably also the zone barriers 22.

The support 16 has a front surface 16A and a rear surface 16B. The front surface 16A is preferably facing the rear surface 12B of the image-displaying element 12.

The support 16 is for example plate shaped, the front surface 16A and the rear surface 16B being the two opposed faces of the support 16.

Advantageously, the support 16 is flexible. In particular, the support 16 is flexible such as to be conformable to the shape of the surface of an object onto which the support 16 is attached.

In one example, the support 16 comprises a light-guiding layer 26, for example defining the front surface 16A of the support 16.

The light sources, e.g. first light emitting diodes 18 and the second light emitting diodes 20, are covered by and/or embedded in the light-guiding layer 26.

Preferably, the light-guiding layer 26 is transparent and provides an optical function of distributing light from the corresponding light source(s) inside each of the lighting zones 24.

The light-guiding layer 26 can be a transparent polymer commonly used to encapsulate LED devices, such as silicone, polyurethane, epoxy, polycarbonate or acrylic/PMMA. The light extraction features can be refractive, reflective, or scattering.

The light sources, e.g. first light emitting diodes 18 and the second light emitting diodes 20, covered by and/or embedded in the light-guiding layer 26 are not exposed to surrounding atmosphere.

The light-guiding layer 26 is made in a light transmitting material that allows light generated by the light sources to emerge from the light-guiding layer 26 and in fine the support 16.

The zones barriers 22 are preferably covered and/or embedded in the light-guiding layer 26.

Preferably, each of the zone barriers 22 extends over the entire thickness of the light-guiding layer 26, and has a height comprised for example between 0.5 and 4 mm.

The optical function of the light-guiding layer 26 allows maintaining a thin backlighting device 14 by limiting the height of the zone barriers 22.

In one example, the support 16 comprises a base layer 28 onto which the light sources are secured, the light-guiding layer 26 covering the base layer 28.

If the base layer 28 and the light-guiding layer 26 are both transparent then a composite light-guide will be form. Then the light will be guided between the light sources inside both layers 26, 28.

If the base layer 28 is not transparent, then reflection or absorption will occur at the light-guiding layer 26 and base layer 28 interface, as illustrated on FIG. 2. This might limit the achievable special homogeneity or optical efficiency, so an additional coating of low refractive index material can be introduced at this interface.

When the support 16 is flexible, the light-guiding layer 26 and, if applicable, the base layer 28 is or are flexible such as to impart flexibility to the support 16.

In operation, the display control unit 13 controls the generation of the image displayed by the image-displaying element 12, and in particular low definition contents in the first region 30 and high definition contents in the second region 32.

The lighting control unit 15 controls individually the light sources of each lighting zone 24 and adjusts the lighting intensity generated by each of the lighting zones 24 according to the image displayed on the corresponding region of the image-displaying element 12.

In the preferred embodiment in which the light source of the lighting zones 24 are light emitting diodes, the lighting control unit 15 controls the first light emitting diode(s) 18 of each first lighting zones 24-1 independently to backlight the first region 30 of the image-displaying element 12. The lighting control unit 15 also controls the second light emitting diode(s) 20 of each second lighting zones 24-2 independently to backlight the second region 32 of the image-displaying element 12. Since the second area A2 of the second lighting zones 24-2 are smaller than the first area A1 of the first lighting zones 24-1, a higher degree of resolution and contrast is achieved in the second region 32 of the image-displaying element 12 (high definition display region).

In the embodiment with zone barriers 22 delimiting the lighting zones 24 and a light-guiding layer 26, the light emitted by the light source(s) is distributed inside each of the lighting zones 24.

The light is divided into a first portion that directly lights the rear surface 12B of the image-displaying element 12 and a second portion that reaches one of the zone barriers 22 delimitating said lighting zone 24.

A first part of this second portion is transmitted to one of the neighboring lighting zones 24 through said zone barrier 22 and a second part of this second portion is reflected by said zone barrier 22 and then lights the rear surface 12B of the image-displaying element 12.

Such a backlighting device 14 with a plurality of lighting zones 24 of different areas A1, A2 allows to match the resolution and contrast requirements of the different displaying regions 30, 32 of the image-displaying element 12, while reducing the total number of light sources and light control components required, which allows to reduce the cost and also to enhance the reliability of the display screen 10.

Furthermore, the zone barriers 22 enable an effective separation of the lighting zones 24 and thus an independent adjusting of the lighting intensity of each lighting zone 24.

Moreover, thanks to the optical function of the light-guide layer 26 in which the light sources and zone barriers 22 are embedded, the thickness of the backlighting device 14 can be reduced even with large lighting zones 24. Thus, large first lighting zone 24-1 can be provided with a unique first light emitting diode 18 to backlight the low definition display region (first region 30). This allows reducing the number of superfluous components.

The invention claimed is:

1. A digital display screen comprising an image displaying element and a backlighting device configured to backlight said image displaying element, the backlighting device defining a plurality of lighting zones, each lighting zone comprising one light source controllable to adjust the lighting intensity generated by the lighting zone, the lighting zones comprising at least one first lighting zone defining a first lighting surface having a first area and at least one second lighting zone defining a second lighting surface having a second area, the second area being smaller than the first area;

wherein the backlighting device comprises zone barriers separating the lighting zones, at least one lighting zone being delimited by zones barriers located at the periphery of the lighting zones, each of the zone barriers being configured for blocking at least part of the light hitting the zone barrier; and wherein the backlighting device comprises a support supporting the light sources, the support comprising a light-guiding layer, the light sources being covered by and/or embedded in the light-guiding layer and the zone barriers being covered by and/or embedded in the light-guiding layer.

2. The digital display screen according to claim 1, wherein each of the zone barriers has a cross-section of substantially triangular shape or parabolic shape.

3. The digital display screen according to claim 1, wherein each of the zone barriers modifies a Point Spread Function of one spot of light delivered by one of the light sources to have a Full Width Half Maximum in the range from 0.5 pixels wide to 5 pixels wide.

4. The digital display screen according to claim 1, wherein the zone barriers are divided into a first group and a second group, the zone barriers of the first group extending perpendicular to the zone barriers of the second group, so as to create an array of rectangular lighting zones.

5. The digital display screen according to claim 1, wherein each of the zone barriers extends over the entire thickness of the light-guiding layer.

6. The digital display screen according to claim 1, wherein the backlighting device comprises a support supporting the light sources.

7. The digital display screen according to claim 6, wherein the support comprises a light-guiding layer, the light sources being covered by and/or embedded in the light-guiding layer.

8. The digital display screen according to claim 1, wherein each of the first lighting zones comprises at least one first light emitting diode defining the light source and each of the second lighting zones comprises at least one second light emitting diode defining the light source.

9. The digital display screen according to claim 8, wherein each first light emitting diode has a first light emitting surface, wherein the first light emitting surface of each first light emitting diode has a first area and each second light emitting diode has a second light emitting surface, wherein the second light emitting surface of each second light emitting diode has a second area, the second area being smaller than the first area.

10. The digital display screen according to claim 8, wherein each of the first lighting zones comprises a unique first light emitting diode and/or each of the second lighting zones comprises a unique second light emitting diode.

11. A vehicle component comprising at least one digital display screen according to claim 1.

* * * * *